April 29, 1969
C. F. SCHULDT
3,441,302
KNOTTER
Filed June 17, 1968
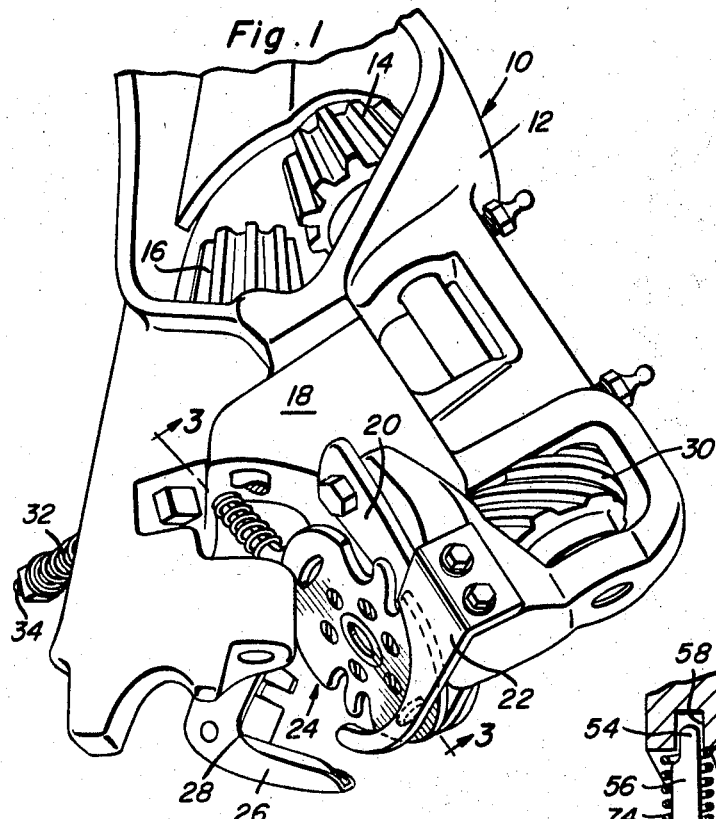
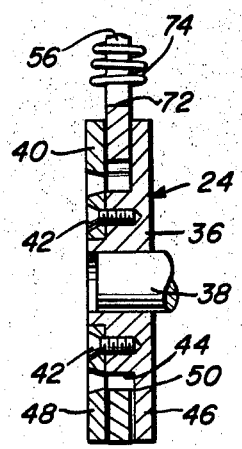
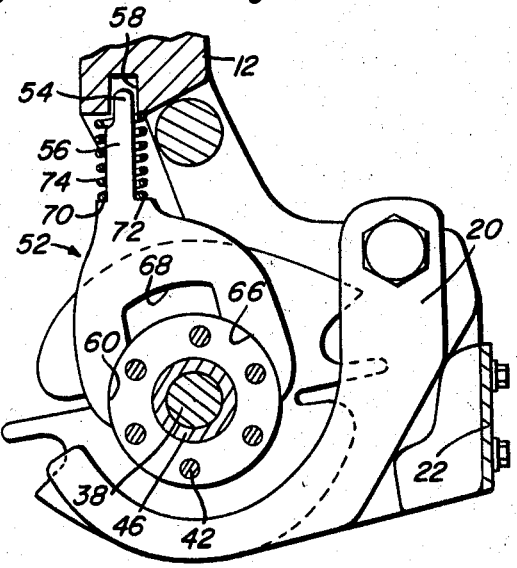
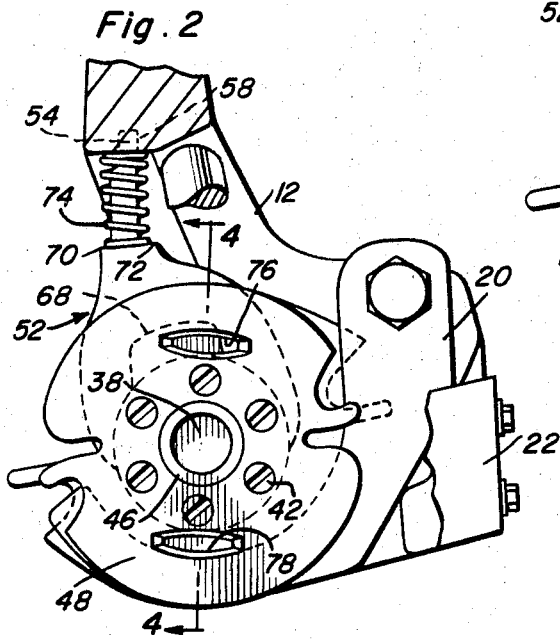
Carl F. Schuldt
INVENTOR.

April 29, 1969  C. F. SCHULDT  3,441,302
KNOTTER

Filed June 17, 1968  Sheet 2 of 2

Carl F. Schuldt
INVENTOR.

BY Clarence A. O'Brien
and Harvey B. Jacobson
Attorneys

Patented Apr. 29, 1969

3,441,302
KNOTTER
Carl F. Schuldt, Idaho Falls, Idaho, assignor to International Harvester Company, Chicago, Ill., a corporation of Delaware
Continuation-in-part of application Ser. No. 628,863, Apr. 6, 1967. This application June 17, 1968, Ser. No. 744,266
Int. Cl. B65h 69/04
U.S. Cl. 289—14                                                     20 Claims

ABSTRACT OF THE DISCLOSURE

A knotter such as that presently being used on International Harvester Hay Balers including a frame rotatably supporting a twine disc assembly defining front and rear discs separated by a hub and having axially spaced outer peripheral portions forming a radially outwardly opening and circumferentially extending groove therebetween and a blade-like disc cleaner having an end portion provided with concave endwise outwardly facing arcuate edge portions disposed and substantially seated on the hub between the outer peripheral portions of the discs. The disc cleaner includes a recess formed therein opening endwise outwardly through centrally disposed portions of the aforementioned arcuate edge portions of the cleaner and with circumferentially spaced openings formed in one of the discs registrable therewith, the registering recess and openings serving to provide a discharge path for automatically discharging dust and debris tending to build up between the cleaner and the hub. Material build-up in this area produces a condition of high resistance to movement of the hub past the cleaner resulting in excessive wear on the drive gears of the disc assembly.

This is a continuation-in-part application of my co-pending application Ser. No. 628,863, filed Apr. 6, 1967, now abandoned.

The knotter of the instant invention is conventional in construction and operation except for the aforementioned recess and the circumferentially spaced openings registrable therewith, one form of the knotter including openings opening radially outwardly of the peirphery of the associated disc and the second form of knotter including openings spaced inwardly from and out of communication with the periphery of the associated disc. Means is provided to yieldingly urge the arcuate edge portion of the cleaner into seated engagement with the bottom of the groove defined between the axially spaced outer peripheral portions of the discs. However, the disc cleaner, by being yieldingly urged into seated engagement within the groove, has its operation appreciably changed in that its improved mounting imparts a vibratory movement thereto which coacts with the circumferentially spaced openings formed in the disc and registrable with the recess formed in the disc cleaner to insure that there will not be a build-up of fluff in the groove between the clamping discs.

An object of this invention is to provide a knotter designed to prevent the build-up of fluff or other debris between the disc hub and the cleaner.

Another object of this invention is to provide a disc assembly with a passage for conducting material separated from the hub by the cleaner.

A further object is to provide a twin disc assembly with knife edges for shearing material wedged between the discs and the cleaner.

A still further object is to provide a means whereby a conventional knotter may be readily modified in accordance with the present invention without extensive changes being made to the conventional knotter.

A final object of this invention is to provide a knotter of conventional construction with modified structural features that will be of simple construction, dependable in operation and require little maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of a conventional form of knotter modified in accordance with one embodiment of the present invention;

FIGURE 2 is a fragmentary side elevational view of the knotter with portions thereof being broken away to more clearly illustrate some of the structural details thereof;

FIGURE 3 is an enlarged fragmentary sectional view taken substantially upon a plane indicated by section line 3—3 of FIGURE 1 and illustrating further details of construction of the modified knotter;

FIGURE 4 is a fragmentary sectional view taken substantially upon the plane indicated by section line 4—4 of FIGURE 2;

Figure 7:
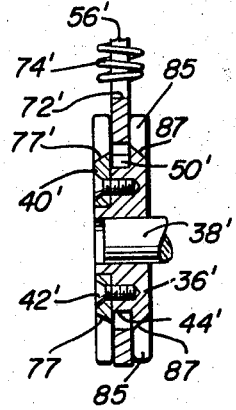
FIGURE 7 is a fragmentary vertical sectional view taken substantially upon the plane indicated by the section line 7—7 of FIGURE 6.

Referring now more specifically to FIGURES 1–4 of the drawings, the numeral 10 generally designates a first conventional form of knotter including a frame 12 of conventional design including a twine disc pinion 14, a bill hook pinion 16, a knotter frame gauging surface 18, a keeper blade 20, a twine knife 22 and a twine disc assembly generally referred to by the reference numeral 24. In addition, the knotter 10 includes a bill hook 26, a bill hook jaw 28, a drive pinion 30 for the twine disc assembly 24 and a bill hook closing cam spring 32 supported from a bolt 34.

The aforementioned specific structural features of the knotter 10, except for the disc assembly 24, are all of conventional design and similar to corresponding structural features disclosed in U.S. Patent No. 3,214,206, dated Oct. 26, 1965.

With attention now invited more specifically to FIGURES 2–4 of the drawing it may be seen that the twine disc assembly 24 includes a rear disc 36 mounted on an arbor or spindle 38 for rotation therewith. The spindle 38 is driven by drive pinion 30 and a front disc 40 is secured to the rear disc 36 by means of removable threaded fasteners 42 spaced circumferentially about the spindle 38. The rear disc 36 is relieved as at 44 so as to form axially spaced outer peripheral portions 46 and 48 of the discs 36 and 40, respectively, defining a circumferentially extending groove 50 therebetween.

An elongated disc cleaner generally referred to by reference numeral 52 is provided and includes an elongated reduced end portion 54 at one end of its shank 56 loosely telescopingly received within an elongated recess 58 provided therefor in the frame 12 opening outwardly toward the disc assembly 24 and the other end of the disc cleaner 52 is a plate-like in configuration and includes arcuate edge portions 60 and 66 seatingly received in the groove 50. Again, as previously set forth, this structure is to be considered as conventional and the only modifications of the disc cleaner 52 represented by the instant invention include the formation of a recess 68 in the plate-like end of the disc cleaner 52 between the arcuate edge portions 60 and 66, the reduction of the width of the shank 56 so as to provide the shoulders 70 and 72 thereon and the installation of a compression spring 74 about the shank 56 between the frame 12 and the shoulders 70 and 72 so as to yieldingly urge the arcuate edge portions 60 and 66 into seated engagement with the bottom of the groove 50. Further, the only modifications of the disc assembly 24 represented by the instant invention is the formation of diametrically opposed slots 76 and 78 in the front disc 40 which are alternately registrable with the recess 68 upon rotation of the twine disc assembly 24 relative to the frame 12.

Without the formation of the recess 68 in the disc cleaner 52, the arcuate edge portions 60 and 66 would be opposite end portions of a continuous arcuate surface and it has been found that there is a tendency for a build-up of fluff and other debris between the discs 36 and 40 when the recess 68 is not present. In addition, the utilization of the compression spring 74 to yieldingly urge the disc cleaner 52 into seating engagement with the bottom of the groove 50 tends to maintain the disc cleaner 52 more precisely positioned and to impart a slight vibratory motion thereto during rotation of the twine disc assembly 24. Further, the formation of the slots or openings 76 and 78 in the front disc 40 in position for registry with the recess 68 provides a means whereby fluff and other debris may be discharged from the groove 50. In fact, rotation of the slots or openings 76 and 78 past the recess 68 tends to create air turbulence during the periods of registry of the openings 76 and 78 with the recess 68 that automatically discharges fluff and other debris within the recess 68 outwardly through the slots or openings 76 and 78.

Figure 5:
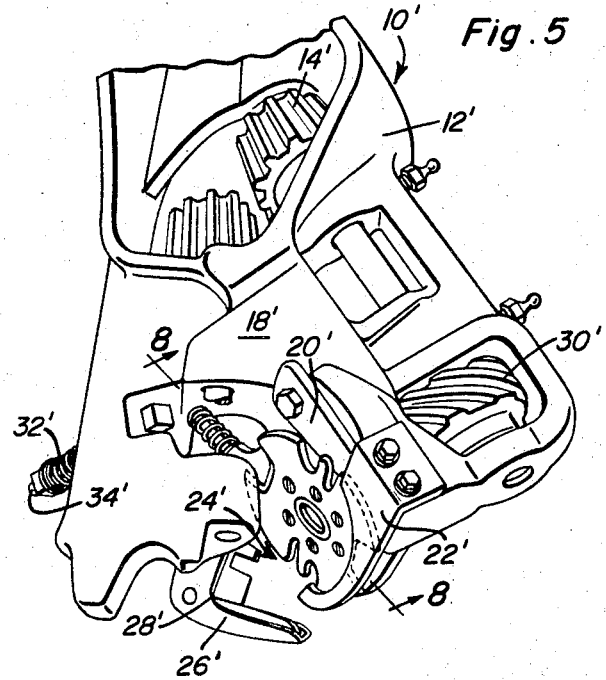
FIGURE 5 is a fragmentary perspective view of a conventional form of knotter modified in accordance with a second embodiment of the present invention.
Figure 8:
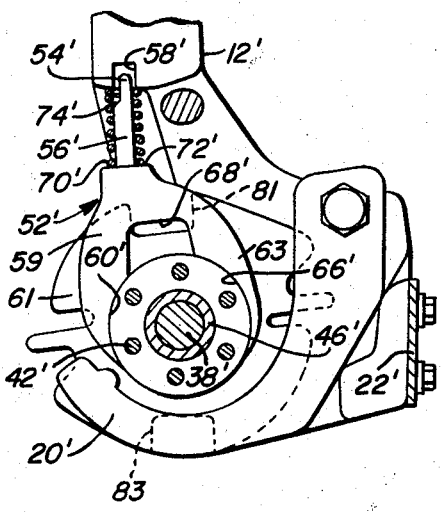
FIGURE 8 is a fragmentary sectional view taken substantially upon the plane indicated by the section line 8—8 of FIGURE 5.
Figure 6:
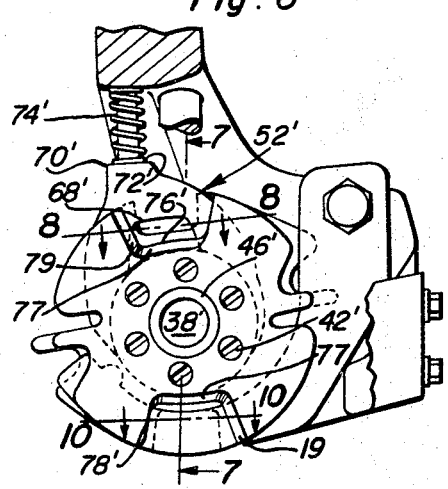
FIGURE 6 is a fragmentary side elevational view of the knotter illustrated in FIGURE 3 with portions thereof being broken away and illustrated in vertical section to more clearly illustrate some of the structural details thereof.
Figure 9:
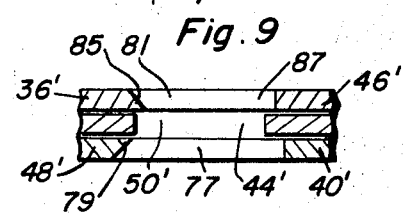
FIGURE 9 is a fragmentary enlarged horizontal sectional view taken substantially upon the plane indicated by the section line 9—9 of FIGURE 6.
Figure 10:
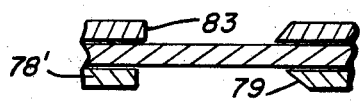
FIGURE 10 is an enlarged fragmentary horizontal sectional view taken substantially upon the plane indicated by the section line 10—10 of FIGURE 6.

With reference now to FIGURES 5–10 of the drawings, the numeral 10' generally designates a second conventional form of knotter including a frame 12' of conventional design, a twine disc pinion 14', a bill hook pinion 16', a knotter frame gauging surface 18', a keeper blade 20', a twine knife 22' and a twine disc assembly generally referred to by the reference numeral 24'. In addition, the knotter 10' includes a bill hook 26', a bill hook jaw 28', a drive pinion 30' for the twine disc assembly 24' and a bill hook closing cam spring 32' supported from a bolt 34'.

Accordingly, it may be seen that the embodiment illustrated in FIGURES 5–10 is quite similar to the embodiment illustrated in FIGURES 1–4 and that prime numerals are utilized to designate portions of the embodiment of FIGURES 5–10 which correspond to the numerals utilized to designate the similar components of the embodiment illustrated in FIGURES 1–4.

The disc assembly 24' may therefore be considered as quite similar to the disc assembly 24 and includes a rear disc 36' mounted on an arbor 38' driven by the pinion 30' and a front disc 40' which is secured to the rear disc 36' by means of suitable threaded fasteners 42'. The rear disc 36' is relieved as at 44' to form a groove 50' between the outer peripheral portions 46' and 48' of the discs 36' and 40', respectively.

An elognated disc cleaner generally referred to by the reference numeral 52' and similar to the cleaner 50 is provided and includes an elongated reduced end portion 54' at one end of its shank 56' loosely telescopingly received within an elongated recess 58' provided therefor in the frame 12' opening outwardly toward the disc assembly 24'. The other end of the disc cleaner 52' includes a plate-like portion 59 which is bifurcated so as to form arcuate edge portions 60' and 66' on the free ends of a pair of forks 61 and 63 defining a recess 68' therebetween. The platelike end portion 59 is received in the groove 50' with the arcuate edge portions 60' and 66' conforming to and abutting and disposed in sliding engagement with the opposing bottom surface portions of the groove 50' defined by the circumferential shoulder formed on the rear disc 36' by the relieved area 44'.

The shank 56' is reduced in transverse dimension relative to the plate-like portion 59 in order to form a pair of shoulders 70' and 72' at the inner end of the shank 56' and a compression spring 74' is disposed about the shank 56' between the shoulders 70' and 72' and the portions of the frame 12' disposed about the outer end of the recess 58'. The spring 74' serves to yieldingly urge the elongated disc cleaner 52' toward the disc assembly 24' and to therefore maintain the arcuate surfaces 60' and 66' in seated sliding engagement with the bottom of the groove 50'.

The front disc 40' has a pair of circumferentially spaced openings 76' and 78' formed therein which correspond to the openings 76 and 78. However, the openings 76' and 78' are in the form of generally radially outwardly opening notches which are in direct communication with and open through the peripheral edge of the front disc 40'. In addition, the edge portions of the front disc 40' defining the openings 76' and 78' are beveled as at 77 and 79 in order to form sharpened edge portions which will cooperate with the forks 61 and 63 of the panel-like portion 59 of the cleaner 52'. Further, the rear disc 36' of the disc assembly 24' includes openings 81 and 83 which are similar to the openings 76' and 78', registered with the latter axially of the disc assembly 24' but slightly shorter in circumferential extent. Further, the openings 81 and 83 are defined by edge portions of the rear disc 36' which are beveled as at 85 and 87 to form sharpened edge portions which also serve to cooperate with the forks 61 and 63 to be disposed in shearing relation therewith in order to cut any material extending from the recess 68' into the openings 81 and 83 during rotation of the disc assembly 24'.

As may be observed from FIGURE 2 of the drawings, the portions of the front disc 40 defining the openings 76 and 78 are also beveled so as to be inwardly convergent and therefore also cooperate with the disc cleaner 52 and the recess 68 formed therein to cut any material extending from within the recess 68 outwardly into either of the openings 76 and 78 during rotation of the disc assembly 24.

Accordingly, it may be seen that either form of improved knotter of the instant invention is capable of operating in a far more desirable manner for extended periods of operation before maintenance is required and that the improvement represented by the instant invention may be readily incorporated into conventional knotter structures of the type hereinbefore illustrated and described.

What is claimed as new is as follows:

1. A knotter mechanism comprising in combination:
a frame;
a disc assembly mounted on said frame and having
a hub, and
a pair of axially spaced discs mounted on said hub, said discs and said hub defining an outwardly opening circumferentially extending groove, each of said discs have strand receiving notches formed in its periphery, said disc assembly being rotatable for positioning strand received in said notches; and
an elongated cleaner member having one end anchored to said frame and another end interposed between said discs, said interposed end having a portion engaging said hub for separating material therefrom attendant to rotation of said assembly, one of said discs having an opening formed therein in registery with said circumferentially extending groove and positioned relative to said portion of said cleaner member so that material separated from said hub passes from said groove through said opening.

2. The invention as recited in claim 1 wherein said opening is particularly positioned to register with the portion of said cleaner member engaging said hub upon rotation of said assembly.

3. The invention as recited in claim 2 wherein said opening is in the form of an arcuate slot.

4. The invention as recited in claim 2 wherein said openings is in the form of a peripheral notch extending radially inwardly substantially the entire depth of said circumferential groove.

5. The invention as recited in claim 1 wherein said opening has a knife-like edge and said elongate cleaner member has an intermediate edge portion disposed in said circumferential groove adjacent said one of said discs and positioned radially to confront said knife-like edge of said opening upon rotation of said assembly whereby material passing through said opening is severed by the action of said knife-like edge passing over said edge portion of said cleaner member.

6. The invention as recited in claim 1 wherein said elongate cleaner member is in the form of a plate and said interposed end includes a bifurcated portion having a pair of forks in engagement with said hub at circumferentially spaced points, said forks defining a recess intermediate said engagement points for receiving and collecting material separated from said hub, said opening also registering with said recess upon rotation of said assembly.

7. The invention as recited in claim 6 and further comprising means for urging said cleaner member radially inwardly relative to said disc assembly whereby said forks yieldably engage said hub.

8. The invention as recited in claim 1 wherein each of said discs have a plurality of said openings formed therein.

9. The invention as recited in claim 1 wherein each of said discs have openings formed therein and placed in generally axial alignment, each opening in each disc having knife-like edges, said cleaner member being in the form of a plate and having axially spaced edges positioned adjacent each disc, each of said openings radially positioned to pass in close conformity with its associated edge of said cleaner member so that material passing through said openings will be severed by the action of the knife-like edge passing over said cleaner member.

10. A knotter mechanism comprising:
a frame;
a disc assembly rotatable on said frame and having
a hub, and
a pair of notched discs axially spaced on said hub, said discs and said hub defining a radially outwardly opening, circumferentially extending groove, one of said discs having a deep notch formed in its periphery, said deep notch extending radially inwardly substantially the full depth of said groove, and
an elongate cleaner plate having one end anchored to said frame, and another end interposed between said discs and having a portion scrapingly engaging said hub for directing material received in said groove radially outwardly thereof, said deep notch being registrable with said interposed end upon rotation of said assembly so that material directed by said cleaner plate will pass from the groove through the deep notch.

11. The invention as recited in claim 10 wherein said cleaner plate has one edge in close conformity with said one of said discs, and said deep notch has a front outwardly extending shoulder and a rear outwardly extending shoulder, said rear shoulder forming a knife-like edge which in passing over said edge of said cleaner plate upon rotation of said assembly severs material extending through said deep notch.

12. The invention as recited in claim 11 wherein said shoulder and said edge of said cleaner plate are angularly disposed so that material extending through said deep notch is scissored by the action of the knife-like edge passing over the edge of said cleaner plate.

13. A knotter mechanism comprising:
a frame;
a disc assembly rotatable on said frame and having a hub and a pair of notched discs axially spaced on said hub, said hub and discs defining a radially outwardly circumferentially extending groove;
a cleaner member having one end anchored to said frame and a forked end interposed between said discs, said forked end engaging said hub at two circumferentially spaced points, and defining a recess intermediate said points of engagement for collecting material; and
means for removing material collected in said recess.

14. The invention as recited in claim 13 wherein said means for removing material includes an opening formed in one of said discs, said opening being registrable with said recess upon rotation of said assembly whereby material collected in said recess may pass from said groove through said opening.

15. The invention as recited in claim 13 and further comprising means for urging said cleaner member toward said hub so that said points of engagement yieldingly engage said hub.

16. The invention as recited in claim 13 wherein said forks are formed with arcuate surfaces conforming to the circumference of said hub, said arcuate surfaces being placed in close conformity to said circumference of said hub thereby providing two scraping surfaces for cleaning said hub.

17. In combination, a knotter of the type including a frame from which a twine disc assembly is rotatably supported, said disc assembly including front and rear disc portions spaced apart along the axis of rotation of said assembly defining a radially outwardly opening and circumferentially extending groove between said front and rear disc portions, an elongated disc cleaner having one end supported from said frame and a plate-like end portion on its other end including concave endwise outwardly facing arcuate edge portions received in said groove and closely opposing the adjacent bottom surface portions of said groove, said plate-like end portion having a central recess formed therethrough which opens outwardly through centrally disposed portions of said arcuate edge portions, and one of said disc portions having an opening formed therethrough intermittently registrable with said recess upon rotation of said disc assembly relative to said frame and cleaner.

18. The combination of claim 17 wherein said elongated cleaner is supported from said frame for slight longitudinal shifting relative to said frame, and means operatively connected between said frame and said elongated disc cleaner yieldingly urging said disc cleaner longitudinally toward said disc assembly to seat arcuate edge portions in said groove.

19. The combination of claim 17 wherein said one disc has a plurality of circumferentially spaced openings formed therein which are registrable with said recess.

20. The combination of claim 19 wherein said openings are in the form of arcuate slots whose centers of curvature generally coincide with the axis of rotation of said disc assembly.

References Cited

UNITED STATES PATENTS

| | | | |
|---|---|---|---|
| 3,215,460 | 11/1965 | Bledsoe et al. | 289—14 |
| 3,232,652 | 2/1966 | Bonga | 289—14 |
| 3,370,875 | 2/1968 | Grillot | 289—14 |

LOUIS K. RIMRODT, *Primary Examiner.*